United States Patent
Stronge et al.

(10) Patent No.: US 10,437,855 B1
(45) Date of Patent: Oct. 8, 2019

(54) AUTOMATIC VERIFICATION OF ASYNCHRONOUSLY REPLICATED DATA

(71) Applicant: EMC IP Holding Company LLC, Hopkinton, MA (US)

(72) Inventors: William Stronge, Westford, MA (US); David Meiri, Somerville, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 222 days.

(21) Appl. No.: 15/662,809

(22) Filed: Jul. 28, 2017

(51) Int. Cl.
G06F 16/27 (2019.01)
G06F 11/14 (2006.01)
G06F 9/455 (2018.01)

(52) U.S. Cl.
CPC ........ G06F 16/273 (2019.01); G06F 11/1469 (2013.01); *G06F 9/45558* (2013.01); *G06F 2009/45583* (2013.01); *G06F 2201/80* (2013.01)

(58) Field of Classification Search
None
See application file for complete search history.

(56) References Cited

U.S. PATENT DOCUMENTS

| | | | |
|---|---|---|---|
| 8,214,612 B1 | 7/2012 | Natanzon | |
| 2004/0260972 A1* | 12/2004 | Ji | G06F 11/2066 714/11 |
| 2009/0132955 A1 | 5/2009 | Garg et al. | |
| 2010/0179941 A1 | 7/2010 | Agrawal et al. | |
| 2013/0325824 A1 | 12/2013 | Shoens | |
| 2014/0143206 A1* | 5/2014 | Pittelko | G06F 11/1448 707/634 |
| 2014/0181016 A1 | 6/2014 | Whitehead et al. | |
| 2015/0149584 A1* | 5/2015 | Yochai | G06F 16/10 709/217 |
| 2016/0150012 A1 | 5/2016 | Barszczak et al. | |

(Continued)

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Alex Gofman
*Assistant Examiner* — Umar Mian
(74) *Attorney, Agent, or Firm* — Ryan, Mason & Lewis, LLP (57) ABSTRACT

An apparatus in one embodiment comprises a storage system having a plurality of storage devices. The storage system is associated with a target site and configured to participate in a cycle-based asynchronous replication process with a storage system of a source site. The storage system of the target site is configured to receive from the storage system of the source site, in respective ones of a plurality of cycles of the cycle-based asynchronous replication process, corresponding sets of differential data representing respective deltas between pairs of source site snapshots for respective pairs of the cycles. The storage system of the target site utilizes the sets of differential data received in the respective ones of the cycles to update respective target site snapshots for those cycles. Over multiple cycles, the storage system of the target site verifies that respective different portions of designated target site and source site snapshots are equivalent.

20 Claims, 6 Drawing Sheets

(56) References Cited

U.S. PATENT DOCUMENTS

2016/0202927 A1   7/2016   Klarakis et al.
2016/0224259 A1   8/2016   Ahrens et al.

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pages.
EMC Corporation, "Introduction to XtremIO Virtual Copies," White Paper, Mar. 2016, 39 pages.
EMC Corporation, "XtremIO Data Production (XDP): Flash-Specific Data Protection, Provided by XtremIO (Ver. 4.0)," White Paper, Apr. 2015, 25 pages.
Dell EMC, "XtremIO v6.0 Specifications," Specification Sheet, 2017, 4 pages.
Dell EMC, "Dell EMC XtremIO X2: Next-Generation All-Flash Array," Data Sheet, 2017, 5 pages.
Itzikr, "DellEMC XtremIO X2/X1 Management, Part 1, The CAS Architecture = Simplicity?," https://xtremio.me/2017/05/08/dellemc-xtremio-x2x1-management-part-1-the-cas-architecture-simplicity/, May 8, 2017, 6 pages.
EMC Corporation, "High Availability, Data Protection and Data Integrity in the XtremIO Architecture," White Paper, Apr. 2015, 28 pages.

* cited by examiner

AUTOMATIC VERIFICATION OF ASYNCHRONOUSLY REPLICATED DATA

FIELD

The field relates generally to information processing systems, and more particularly to storage in information processing systems.

BACKGROUND

Many information processing systems are configured to replicate data from a storage system at one site to a storage system at another site. In some cases, such arrangements are utilized to support disaster recovery functionality within the information processing system. For example, an enterprise may replicate data from a production data center to a disaster recovery data center. In the event of a disaster at the production site, applications can be started at the disaster recovery site using the data that has been replicated to that site so that the enterprise can continue its business.

Data replication in these and other contexts can be implemented using asynchronous replication. For example, asynchronous replication may be configured to periodically transfer data in multiple cycles from a source site to a target site. Conventional approaches to asynchronous replication have a number of significant drawbacks. For example, verifying all of the transferred data in each cycle can unduly lengthen the cycles and thereby undermine the efficiency of the replication process. This can in turn make it difficult to achieve a desired recover point objective within the information processing system.

SUMMARY

Illustrative embodiments provide automatic verification of asynchronously replicated data in information processing systems. Such embodiments can advantageously provide significantly improved efficiency in verification of data replicated from a source site to a target site of a given information processing system. These embodiments are therefore better able to achieve desired recover point objectives.

In one embodiment, an apparatus comprises a storage system comprising a plurality of storage devices. The storage system is associated with a target site and configured to participate in a cycle-based asynchronous replication process with a storage system of a source site. The storage system of the target site is configured to receive from the storage system of the source site, in respective ones of a plurality of cycles of the cycle-based asynchronous replication process, corresponding sets of differential data representing respective deltas between pairs of source site snapshots for respective pairs of the cycles. The storage system of the target site utilizes the sets of differential data received in the respective ones of the cycles to update respective target site snapshots for those cycles.

Over multiple ones of the cycles, the storage system of the target site generates target site signatures for respective different portions of a designated one of the updated target site snapshots, receives from the storage system of the source site corresponding source site signatures for respective different portions of a designated one of the source site snapshots, and compares the target site and source site signatures in order to verify that the designated target site and source site snapshots are equivalent. The verification of equivalence of the designated target site and source site snapshots is thereby spread over the multiple cycles with pairs of target site and source site signatures for the different portions of those snapshots being compared in respective ones of the multiple cycles.

The storage devices of a given one of the storage systems in some embodiments comprise non-volatile memory devices. For example, the storage devices of the storage systems of the target site and the source site in such embodiments can be configured to collectively provide respective all-flash storage arrays.

Additionally or alternatively, one or both of the storage systems may each comprise a clustered storage system having a plurality of storage nodes each having a plurality of storage devices. For example, a given storage system may be implemented in a distributed manner so as to comprise a plurality of distributed storage system components implemented on respective ones of the storage nodes of the clustered storage system. Numerous other storage system arrangements are possible in other embodiments.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
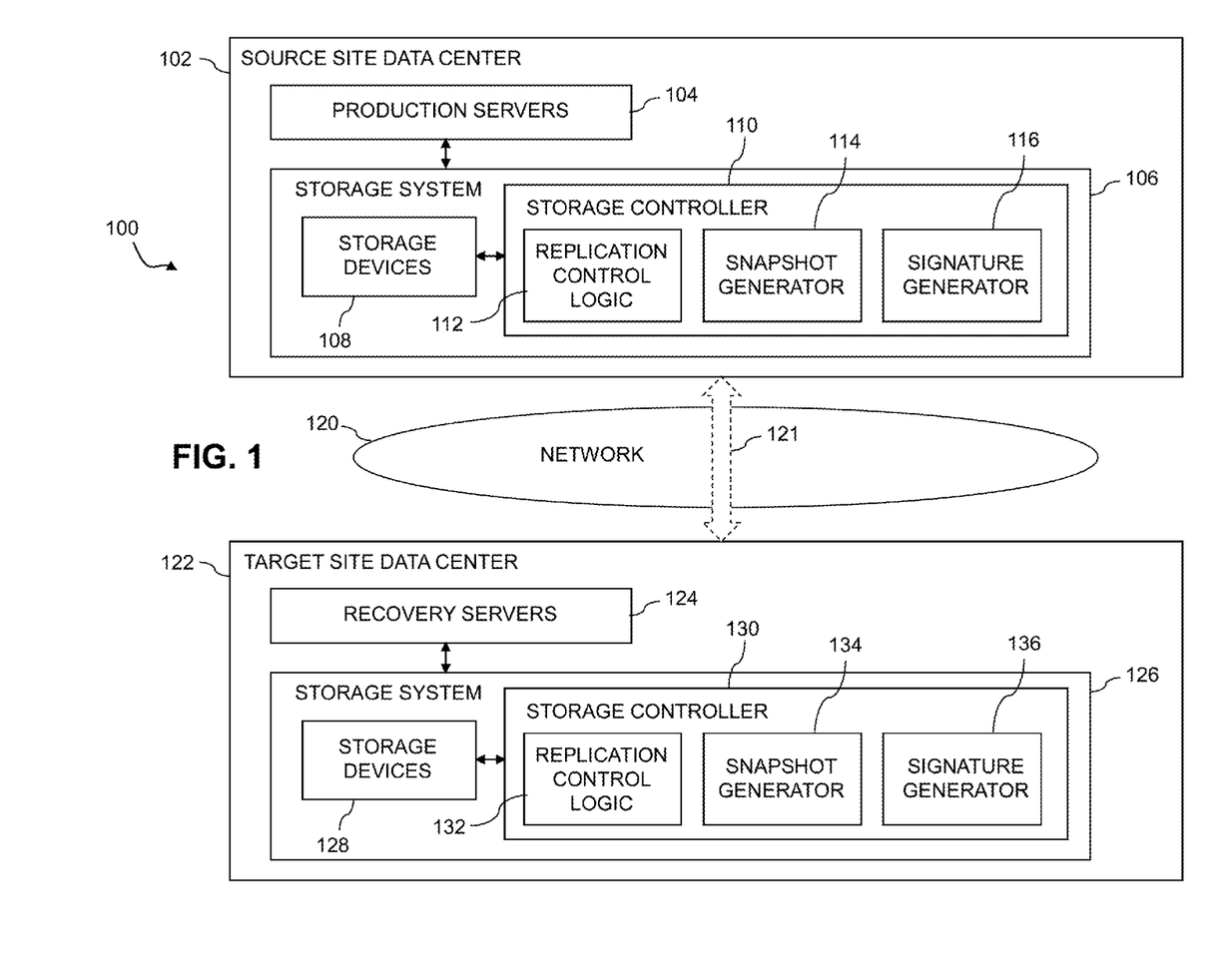
FIG. 1 is a block diagram of an information processing system comprising target site and source site storage systems configured for automatic verification of asynchronously replicated data in an illustrative embodiment.

FIG. 1 shows an information processing system 100 configured in accordance with an illustrative embodiment. The information processing system 100 comprises a source site data center 102 having a set of production servers 104 coupled to a storage system 106. The storage system 106 comprises storage devices 108 and an associated storage controller 110. The storage controller 110 comprises replication control logic 112, snapshot generator 114 and signature generator 116.

The source site data center 102 is coupled via at least one network 120 comprising communication channels 121 to a target site data center 122 of the system 100. The target site data center 122 comprises a set of recovery servers 124 coupled to a storage system 126. The storage system 126 comprises storage devices 128 and an associated storage controller 130. The storage controller 130 comprises replication control logic 132, snapshot generator 134 and signature generator 136.

The source site data center 102 and the target site data center 122 are examples of what are more generally referred to herein as respective ones of a "source site" and a "target site" of an information processing system. The source site data center 102 and the target site data center 122 will therefore also be referred to herein as respective source site 102 and target site 122 of the system 100. In some embodiments, the target site 122 comprises a disaster recovery site data center and the source site 102 comprises a production site data center, although other arrangements are possible.

The source site 102 and target site 122 may be implemented in respective distinct local and remote geographic locations, although it is also possible for the two sites to be within a common facility or even implemented on a common processing platform.

It is assumed that data is replicated in system 100 from the source site 102 to the target site 122 using a cycle-based asynchronous replication process. For example, asynchronous replication may be configured to periodically transfer data in multiple cycles from the source site 102 to the target site 122. The data replicated from the source site 102 to the target site 122 can include all of the data stored in the storage system 106, or only certain designated subsets of the data stored in the storage system 106. Different replication processes of different types can be implemented for different parts of the stored data.

In order to conserve bandwidth on the communication channels 121 between the source site 102 and the target site 122, data is transferred incrementally. This means that instead of sending all the data stored at the source site 102 to the target site 122 in each cycle, only the data that has been changed during each cycle is transferred. The changed data is an example of what is more generally referred to herein as "differential data." A given set of differential data transferred from the source site 102 to the target site 122 in a given one of the cycles of the cycle-based asynchronous replication process represents a "delta" between a pair of source site snapshots generated by the snapshot generator 114 of the storage controller 110 for a corresponding pair of the cycles. Each source site snapshot captures the state at a particular point in time of the data to be replicated from the source site 102 to the target site 122. It is assumed that one such source site snapshot is generated by the snapshot generator 114 in conjunction with each of the cycles of the asynchronous replication process.

A given one the cycles of the cycle-based asynchronous replication process illustratively encompasses an amount of time spent sending a corresponding one of the sets of differential data or deltas from the source site 102 to the target site 122. There is a lag time between the data at the source site 102 and the replicated data at the target site 122. More particularly, the replicated data at the target site 122 is "older" than the data at the source site 102 by the lag time, as the production servers 104 continue to write to the storage system 106 after the source site snapshots are taken for respective ones of the cycles. For example, if the cycles of the cycle-based asynchronous replication process each take 30 seconds, then the lag time in some embodiments may vary between 30 seconds and 60 seconds. A recover point objective or RPO in some embodiments can be specified as a maximum amount of lag time that the replicated data can have.

The lag time in some embodiments is more particularly specified as an amount of time between initiation of transfer of a given one of the sets of differential data by the storage system 106 of the source site 102 and update of the corresponding target site snapshot by the storage system 126 of the target site 122. It is to be appreciated, however, that other specifications of the lag time can be used.

As noted above, an advantage of transferring data incrementally from the source site 102 to the target site 122 using a cycle-based asynchronous replication process is that it conserves bandwidth on the communication channels 121. For example, each byte of data written by the production servers 104 to the storage system 106 need only be transferred once. However, the downside is that if there is problem in any one of the cycles, the replicated data at the target site 122 will be corrupted from that point on. This is a silent corruption that without appropriate verification of the replicated data will not be discovered until recovery servers 124 are started and begin to utilize the replicated data in conjunction with disaster recovery or another similar type of recovery situation. It is therefore very important for the replicated data to be verified in an appropriate manner before such a recovery situation arises. Illustrative embodiments provide particularly efficient techniques for automatic implementation of such verification without the need for administrator intervention.

The production servers 104 at the source site illustratively run applications for users of the system 100. These servers are configured to store application data in the storage system 106. This application data is illustratively part of the data stored in storage system 106 that is replicated from the source site 102 to the target site 122. The recovery servers 124 at the target site 122 are configured to take up the running of the applications for the users of the system 100 in the event of a disaster recovery or other recovery situation. The applications on the recovery servers 124 of the target site 122 are started using the data that has been replicated to the target site 122 in the cycle-based asynchronous replication process.

The production servers 104 and recovery servers 124 of the respective source site 102 and target site 122 illustratively comprise respective processing devices of one or more processing platforms of the corresponding source site 102 or target site 122. For example, these servers can comprise respective virtual machines (VMs) each having a processor and a memory, although numerous other configurations are possible.

At least portions of the source site 102 and target site 122 can be implemented in cloud infrastructure such as an Amazon Web Services (AWS) system. Other examples of cloud-based systems that can be used to implement at least portions of system 100 include Google Cloud Platform (GCP) and Microsoft Azure.

In some embodiments, compute and storage services may be provided for users of system 100 under a platform-as-a-service (PaaS) model, although it is to be appreciated that numerous other cloud infrastructure arrangements could be used. Also, illustrative embodiments can be implemented outside of the cloud infrastructure context, as in the case of a stand-alone enterprise-based computing and storage system.

The term "user" herein is intended to be broadly construed so as to encompass numerous arrangements of human, hardware, software or firmware entities, as well as combinations of such entities.

As indicated previously, the storage systems 106 and 126 of the source and target sites 102 and 122 are configured in the present embodiment for automatic verification of asynchronously replicated data over multiple cycles of a cycle-based asynchronous replication process. This illustratively involves asynchronously replicating data from the storage devices 108 of the storage system 106 to the storage devices 128 of the storage system 126 and automatically verifying the correctness of portions of the replicated data over multiple cycles.

As will be described in more detail below, the automatic verification of the asynchronously replicated data in the present embodiment is performed in a manner that advantageously avoids the need to verify all of the transferred data in each cycle. As a result, the cycles can be made significantly more compact than would otherwise be possible. This results in enhanced efficiency in the replication process and thereby facilitates the achievement of recover point objectives in system 100.

The storage systems 106 and 126 of the source and target sites 102 and 122 may comprise respective content addressable storage systems having respective sets of non-volatile memory storage devices.

Additionally or alternatively, the storage systems 106 and 126 of the source and target sites 102 and 122 may comprise respective clustered storage systems having respective sets of storage nodes each having a plurality of storage devices.

In some embodiments, the storage systems 106 and 126 illustratively comprise scale-out all-flash storage arrays such as XtremIO™ storage arrays from Dell EMC of Hopkinton, Mass. Other types of storage arrays, including by way of example VNX® and Symmetrix VMAX® storage arrays also from Dell EMC, can be used to implement storage systems in other embodiments. A given such storage array can be configured to provide storage redundancy using well-known RAID techniques such as RAID 5 or RAID 6, although other storage redundancy configurations can be used.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing a given storage system in an illustrative embodiment include, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators in the S-Series, X-Series and NL-Series product lines, all from Dell EMC. Combinations of multiple ones of these and other storage products can also be used in implementing a given storage system in an illustrative embodiment.

The storage devices 108 and 128 of respective storage systems 106 and 126 illustratively implement a plurality of logical units (LUNs) configured to store files, blocks, objects or other arrangements of data.

In some embodiments, the storage devices 108 and 128 comprise solid state drives (SSDs). Such SSDs are implemented using non-volatile memory (NVM) devices such as flash memory.

Other types of NVM devices that can be used to implement at least a portion of the storage devices 108 and 128 include non-volatile random access memory (NVRAM), phase-change RAM (PC-RAM) and magnetic RAM (MRAM). Various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In one possible distributed implementation of a storage system, the storage system comprises a clustered storage system having a plurality of storage nodes each having a plurality of storage devices. The storage system 106 or 126 may represent a single storage node of such a clustered storage system. Alternatively, the storage system 106 or 126 may represent multiple storage nodes.

It is also possible for the storage controller 110 or 130 to be implemented in a distributed manner so as to comprise a plurality of distributed storage controller components implemented on respective ones of the storage nodes of the clustered storage system.

Although illustratively shown as being implemented within the storage system 106 or 126, the storage controller 110 or 130 in other embodiments can be implemented at least in part within another system component.

The network 120 is assumed to comprise a portion of a global computer network such as the Internet, although other types of networks can be part of the network 120, including a wide area network (WAN), a local area network (LAN), a satellite network, a telephone or cable network, a cellular network, a wireless network such as a WiFi or WiMAX network, or various portions or combinations of these and other types of networks. The network 120 in some embodiments therefore comprises combinations of multiple different types of networks each comprising processing devices configured to communicate using IP or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

In the present embodiment, the storage system 126 of the target site 122 is configured to participate in a cycle-based asynchronous replication process with the storage system 106 of the source site 102. This cycle-based asynchronous replication process is illustratively implemented in system 100 by cooperative interaction of the storage systems 106 and 126 over network 120 using their respective replication control logic 112 and 132, snapshot generators 114 and 134, and signature generators 116 and 136. Examples of cycles of an illustrative cycle-based asynchronous replication process of this type without automatic verification and with automatic verification will be described in more detail below in conjunction with respective FIGS. 3 and 4.

The storage system 126 of the target site 122 is more particularly configured in this embodiment to receive from the storage system 106 of the source site 102, in respective ones of a plurality of cycles of the cycle-based asynchronous replication process, corresponding sets of differential data representing respective deltas between pairs of source site snapshots for respective pairs of the cycles. The source site snapshots are generated by the snapshot generator 114 of the storage controller 110.

The storage system 126 of the target site 122 illustratively utilizes the sets of differential data received in the respective ones of the cycles to update respective target site snapshots for those cycles. The target site snapshots are generated by the snapshot generator 134 of the storage controller 130.

Over multiple ones of the cycles, the storage system 126 of the target site 122 generates target site signatures for respective different portions of a designated one of the updated target site snapshots. The target site signatures are generated by the signature generator 136 of the storage controller 130. The storage system 126 also receives from the storage system 106 of the source site 102 corresponding source site signatures for respective different portions of a designated one of the source site snapshots. The source site signatures are generated by the signature generator 116 of the storage controller 110. The storage system 126 compares the target site and source site signatures over the multiple cycles in order to verify that the designated target site and source site snapshots are equivalent.

The verification of equivalence of the designated target site and source site snapshots in this embodiment is therefore spread over the multiple cycles, with pairs of target site and source site signatures for the different portions of those snapshots being compared in respective ones of the multiple cycles.

Terms such as "equivalent" and "equivalence" as used herein in conjunction with verification of replicated data by comparison of target site and source site snapshots are intended to be broadly construed to encompass various arrangements for confirming that the target site snapshot is an accurate and correct version of its corresponding source site snapshot. Such equivalence herein is a type of functional equivalence in that the replicated data when utilized by one or more applications running on the recovery servers 124 will produce the same results that would be produced by the corresponding source site data when utilized by one or more applications running on the production servers 104.

It is also important to note that the transferring of the data in cycles in this embodiment is separate from the verifying of the transferred data. The data transferred each cycle comprises the above-noted delta between two snapshots taken at respective ones of two different points in time. The data verification illustratively involves selecting a particular one of the target site snapshots, and then verifying the data in that snapshot over multiple cycles through the comparison of target site signatures for different portions of the selected target site snapshot to corresponding source site signatures. The transferred data comprising the deltas sent from the source site 102 to the target site 122 are not verified in each cycle.

The target site and source site signatures generated by the respective signature generators 116 and 136 illustratively comprise at least one of a checksum and a hash of corresponding portions of the designated target site and source site snapshots.

The different portions of the designated target site and source site snapshots for which the verification of equivalence is spread over the multiple cycles of the cycle-based asynchronous replication process may comprise respective percentages of the designated target site and source site snapshots. For example, different percentages of the designated target site and source site snapshots may be utilized in different ones of the multiple cycles. Alternatively, a fixed percentage of the designated target site and source site snapshots may be utilized in each of the multiple cycles. As a more particular example of the latter approach, the target site and source site signatures for different n percent portions of the designated target site and source site snapshots are verified in each of 100/n of the cycles.

In these and other embodiments, the different portions of the designated target site and source site snapshots for which the verification of equivalence is spread over the multiple cycles can be determined at least in part based on a number n of the cycles of the cycle-based asynchronous replication process that are expected to be executed within a given time period. For example, the different portions of the designated target site and source site snapshots for which the verification of equivalence is spread over the multiple cycles may be determined by first determining the expected number of cycles n for the given time period and then computing 100/n to determine a percentage of the designated target site and source site snapshots to be verified in each of the n cycles.

Additionally or alternatively, the different portions of the designated target site and source site snapshots for which the verification of equivalence is spread over the multiple cycles can be dynamically adapted over time in order to control a lag time between initiation of transfer of a given one of the sets of differential data by the storage system 106 of the source site 102 and update of the corresponding target site snapshot by the storage system 126 of the target site 122.

For example, such dynamic adaptation can be implemented by, for a current one of the multiple cycles, calculating a verification rate as a function of a time elapsed for verification of a given one of the portions in a previous one of the multiple cycles, calculating an amount of time remaining in a recover point objective period for the current cycle, and multiplying the verification rate by the amount of time remaining in the recover point objective period for the current cycle to determine a particular portion of the designated target site and source site snapshots to be verified in the current cycle.

If the particular portion determined by multiplying the verification rate by the amount of time remaining in the recover point objective period for the current cycle is less than a specified minimum portion, the minimum portion is verified in the current cycle.

Further details regarding automatic verification of asynchronously replicated data will be described below in conjunction with FIGS. 2, 3 and 4.

Each of the source site 102 and target site 122 in the FIG. 1 embodiment is assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

As a more particular example, the storage controllers 110 and 130 or various components thereof can each be implemented in the form of one or more LXCs running on one or more VMs. Other arrangements of one or more processing devices of a processing platform can be used to implement the storage controllers 110 and 130 and/or their respective components. Other portions of the system 100 can similarly be implemented using one or more processing devices of at least one processing platform.

The source site 102 and target site 122 are illustratively implemented on respective distinct processing platforms, although numerous other arrangements are possible. For example, in some embodiments at least portions of the source site 102 and the target site 122 may be implemented on the same processing platform. The term "processing platform" as used herein is intended to be broadly construed so as to encompass, by way of illustration and without limitation, multiple sets of processing devices and associated storage systems that are configured to communicate over one or more networks.

It is to be appreciated that these and other features of illustrative embodiments are presented by way of example only, and should not be construed as limiting in any way.

Accordingly, different numbers, types and arrangements of system components such as source and target sites 102 and 122 and their respective storage systems 106 and 126 and storage controllers 110 and 130 can be used in other embodiments.

It should therefore be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments a given content addressable storage system or other type of storage system with functionality for automatic verification of asynchronously replicated data can be offered to cloud infrastructure customers or other users as a PaaS offering.

The operation of the information processing system 100 will now be described in further detail with reference to the flow diagram of the example embodiment of FIG. 2. The process as shown includes steps 200 through 204, and is suitable for use in the system 100 but is more generally applicable to other types of information processing systems in which source and target sites engage in a cycle-based asynchronous replication process.

In step 200, a target site storage system receives from source site storage system, in respective ones of a plurality of cycles of a cycle-based asynchronous replication process, corresponding sets of differential data representing respective deltas between pairs of source site snapshots for respective pairs of the cycles In step 202, the target site storage system utilizes the sets of differential data received in the respective ones of the cycles to update respective target site snapshots for those cycles.

In step 204, over multiple ones of the cycles, the target site storage system generates target site signatures for respective different portions of a designated one of the updated target site snapshots, receives from the source site storage system corresponding source site signatures for respective different portions of a designated one of the source site snapshots, and compares the target site and source site signatures in order to verify that the designated target site and source site snapshots are equivalent.

As indicated previously, the data verification in some embodiments disclosed herein illustratively involves selecting a particular one of the target site snapshots, and then verifying the data in that snapshot over multiple cycles through the comparison of target site signatures for different portions of the selected target site snapshot to corresponding source site signatures. This data verification is separate from the transferring of the data in cycles. The data transferred each cycle comprises the above-noted delta between two snapshots taken at respective ones of two different points in time. The deltas sent from the source site to the target site are not verified in each cycle.

Figure 2:
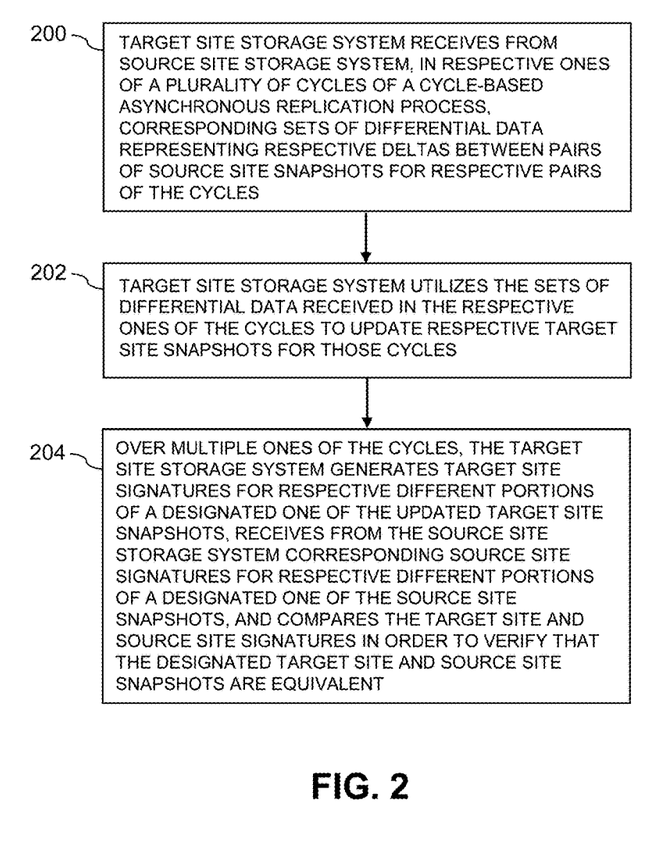
FIG. 2 is a flow diagram of a process for automatic verification of asynchronously replicated data in an illustrative embodiment.

Steps 200, 202 and 204 of the FIG. 2 process can be repeatedly iterated as needed, in order to perform substantially continuous verification as additional data from the source site is replicated at the target site.

In the context of the FIG. 1 embodiment, the steps 200, 202 and 204 are illustratively performed by the storage controller 130 of the storage system 126 acting in cooperation with the storage controller 110 of the storage system 106. For example, the steps of the process are performed by replication control logic 132 of the target site 122 interacting with replication control logic 112 of the source site 102. Such interaction illustratively includes initiating and managing the various cycles of the asynchronous replication process as well as generating any needed snapshots and signatures.

It is also to be appreciated that the FIG. 2 process and other features and functionality for automatic verification of asynchronously replicated data as described above can be adapted for use with other types of information systems, including by way of example an information processing system in which source site and target site storage systems are both implemented on the same processing platform.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving automatic verification of asynchronously replicated data. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different automatic verification processes for respective different storage systems of a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as storage controller 130 that is configured to control performance of steps 200, 202 and 204 of the FIG. 2 process can be implemented as part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. The storage controller 130, as well as other system components, may be implemented at least in part using processing devices of such processing platforms. For example, in a distributed implementation of the storage controller 130, respective distributed modules of such a storage controller can be implemented in respective LXCs running on respective ones of the processing devices of a processing platform. Storage controller 110 can be implemented in a similar manner.

Additional illustrative embodiments will now be described with reference to the example cycle-based asynchronous replication processes of FIGS. 3 and 4. More particularly, FIG. 3 shows an example of cycle-based asynchronous replication of data without automatic verification in an illustrative embodiment, and FIG. 4 shows an example of cycle-based asynchronous replication of data with automatic verification in an illustrative embodiment.

Figure 3:
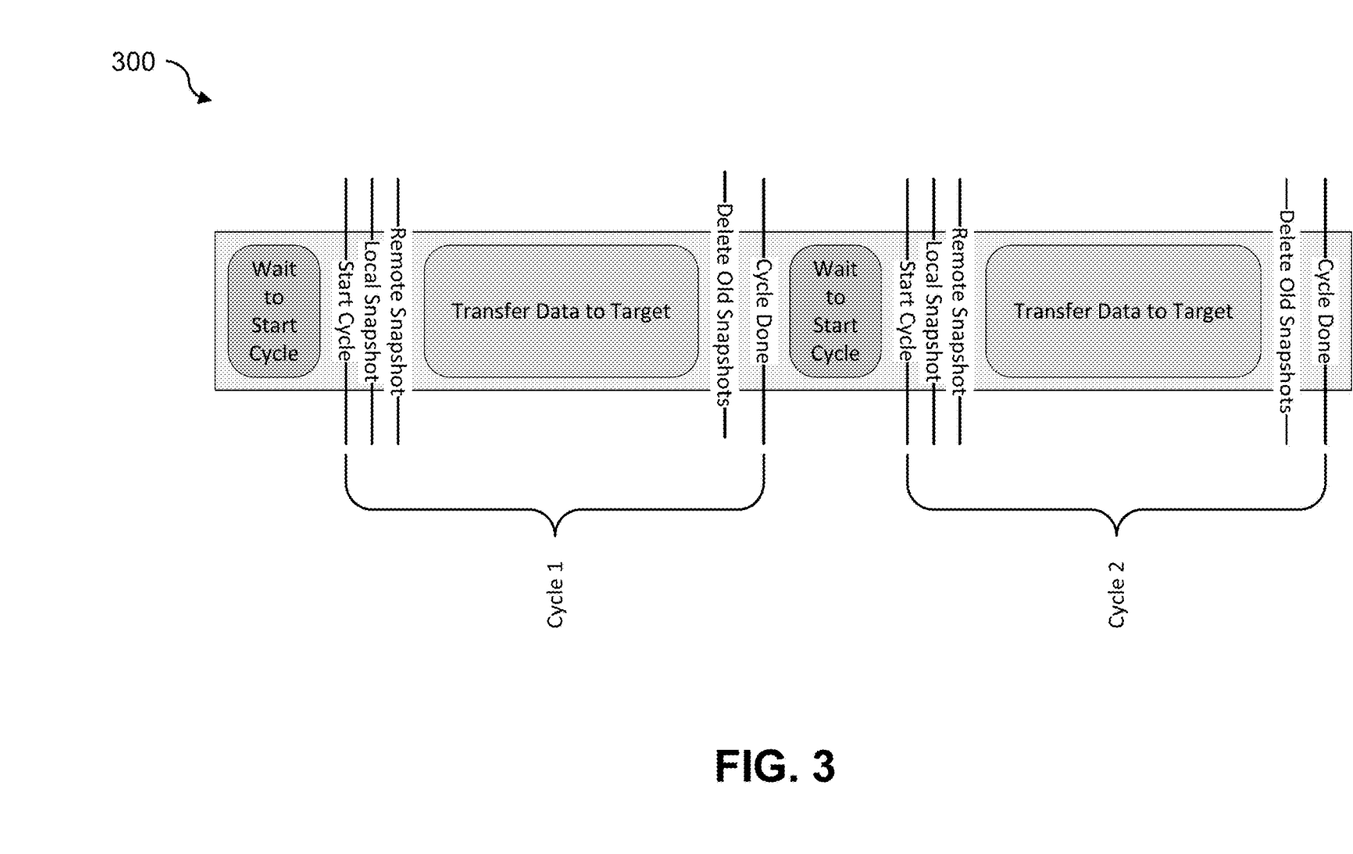
FIG. 3 shows an example of cycle-based asynchronous replication of data without automatic verification in an illustrative embodiment.

Referring initially to FIG. 3, the portion 300 of the cycle-based asynchronous replication process illustrated in the figure includes two full cycles, denoted Cycle 1 and Cycle 2. At the beginning of each cycle, source site and target site snapshots are taken of the respective source and target data by respective source site and target site snapshot generators, such as snapshot generators 114 and 134 of FIG. 1. The source site and target site snapshots in this embodiment are referred to in the figure as respective "local" and "remote" snapshots. The differential data or delta is then transferred from the source site to the target site, and any old snapshots that are no longer needed are deleted. There is then a waiting period before the start of the next cycle, as illustrated in the figure. Additional cycles of the process are assumed to be configured in a manner similar to that illustrated for Cycle 1 and Cycle 2 in the figure.

In this particular example, the local snapshot taken at the source site for Cycle 2 contains the same data used to generate the local snapshot for Cycle 1, plus whatever additional data was written by the source site production servers to the source site storage system during Cycle 1 and its post-cycle waiting period. The delta to be transferred from the source site to the target site during Cycle 2 is therefore generated as the differential data between the local snapshot for Cycle 1 and the local snapshot for Cycle 2. The target site receives this delta transferred during Cycle 2 and utilizes it to update its remote snapshot. As a result, at the end of Cycle 2, the local snapshot for Cycle 2 at the source site and the updated remote snapshot for Cycle 2 at the target site should be equal. This situation is confirmed by the target site using replicated data verification of the type previously described herein.

Figure 4:
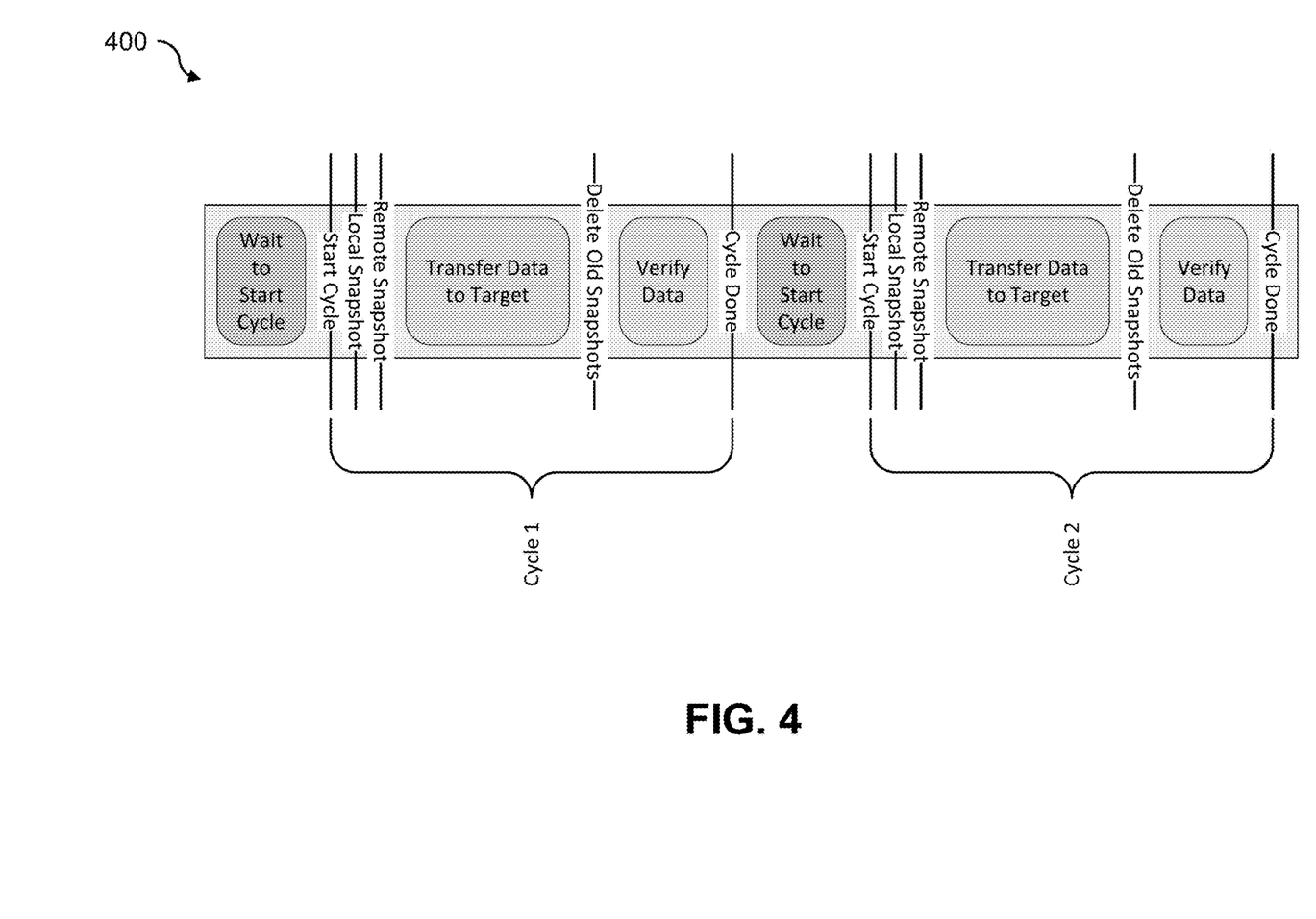
FIG. 4 shows an example of cycle-based asynchronous replication of data with automatic verification in an illustrative embodiment.

The example of FIG. 4 illustrates one possible technique for implementing the replicated data verification in this embodiment. It can be seen that each of Cycle 1 and Cycle 2 in portion 300 of the cycle-based asynchronous replication process in FIG. 3 has now been modified in corresponding portion 400 of FIG. 4 to include a data verification phase located between the deletion of old snapshots and the end of the cycle.

In this data verification phase, a signature of a portion of a selected target site snapshot is compared to a signature of the same portion of the corresponding source site snapshot to confirm that the portions are the same. Only a portion of the selected target site snapshot is verified in each cycle, such that it takes multiple cycles of the cycle-based asynchronous replication process in order to complete the full verification of the selected target site snapshot. Each of the signatures may comprise a checksum, hash or other signature generation function of the particular portion of the target site or source site snapshot to which it corresponds. Combinations of checksums, hashes and other signature generation functions can be used in other embodiments. The exact signature algorithm used can vary depending upon the specific needs of a given implementation, as will be appreciated by those skilled in the art.

The FIG. 4 embodiment therefore verifies the transferred data by periodically selecting a target site snapshot and confirming that the data it contains is the same as that of its corresponding source site snapshot. However, this verification proceeds over multiple cycles of the cycle-based asynchronous replication process, with different portions of the target site and source site snapshots being compared based on their respective signatures in different data verification phases of the multiple cycles. Such an approach advantageously avoids the aforementioned problems that would otherwise be associated with attempting to verify all of the transferred data within the same cycle in which it was transferred. For example, the cycles can be made much more compact than would otherwise be possible, thereby reducing the lag time between the source site data and the replicated data at the target site. This also facilitates the achievement of desired recover point objectives.

The verification of the data transferred within a given one of the cycles of the FIG. 4 embodiment can be distributed over multiple ones of the cycles in a variety of different ways, as previously indicated for other embodiments herein.

For example, the different portions of the selected target site and source site snapshots for which the verification is spread over the multiple cycles may comprise respective percentages of the designated target site and source site snapshots. As a more particular example, if different portions each comprising 25% of the selected target site and source site snapshots were verified in each cycle, then it would take a total of four cycles to verify the selected pair of snapshots, but the adverse effect on the lag time would be much smaller than it would be if the pair of snapshots were verified in a single cycle.

Other fixed percentages of the selected target site and source site snapshots may be verified in each of multiple cycles. For example, the target site and source site signatures for different n percent portions of the designated target site and source site snapshots may be verified in each of 100/n of the cycles.

In such arrangements, a fixed percent of the selected target site and source site snapshots are verified each cycle. For example, at 10% it would take 10 cycles to completely verify a pair of snapshots. It is also possible that different percentages of the designated target site and source site snapshots may be utilized in different ones of the multiple cycles.

Other examples include various timed and adaptive arrangements.

For example, a given timed arrangement attempts to verify a pair of snapshots in a fixed amount of time. This illustratively involves determining the number of cycles that are expected to be run in the time period, and dividing 100% by the number of cycles to get the percentage of the snapshots that must be verified each cycle in order for the pair to be fully verified within the time period.

Numerous other timed arrangements can be configured in which the different portions of the selected target site and source site snapshots for which the verification is spread over the multiple cycles are dynamically adapted over time in order to control the lag time.

In one possible adaptive arrangement, the percentage of snapshots verified in each cycle is adapted in order to limit the impact on the lag time. For a current one of the multiple cycles, this illustratively involves calculating a verification rate (e.g., percentage/second) as a function of a time elapsed for verification of a given one of the portions in a previous one of the multiple cycles, and calculating an amount of time remaining in a recover point objective period for the current cycle. The verification rate is then multiplied by the amount of time remaining in the recover point objective period for the current cycle to determine a particular portion of the designated target site and source site snapshots to be verified in the current cycle. If the particular portion determined by multiplying the verification rate by the amount of time remaining in the recover point objective period for the current cycle is less than a specified minimum portion, the minimum portion is verified in the current cycle. This minimum portion is utilized to ensure that the even if the recover point objective is being exceeded at the moment, the data verification proceeds and eventually finishes.

It is to be appreciated that the particular cycle configuration and associated process operations as shown in FIGS. 3 and 4 are examples only, and numerous alternative cycle-based asynchronous replication processes can be used in other embodiments. For example, the placement of the data verification phase within each of the cycles of the cycle-based asynchronous replication process can be varied in other embodiments.

Illustrative embodiments of information processing systems with functionality for automatic verification of asynchronously replicated data as disclosed herein can provide a number of significant advantages relative to conventional arrangements.

For example, some embodiments can advantageously provide significantly improved efficiency in verification of data replicated from a source site to a target site of a given information processing system. These embodiments avoid the need to verify all of the transferred data in each cycle, and are therefore better able to achieve desired recover point objectives within the information processing system.

Illustrative embodiments perform verification of replicated data in a fully automated manner, and therefore without the need for intervention of a system administrator or other similar manual operations.

Moreover, verification is performed in illustrative embodiments over multiple cycles of an asynchronous replication process in a simple but effective manner without undue complexities such as requiring that applications be started on recovery servers in order to perform integrity checks on the transferred data.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as storage systems 106 and 126, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
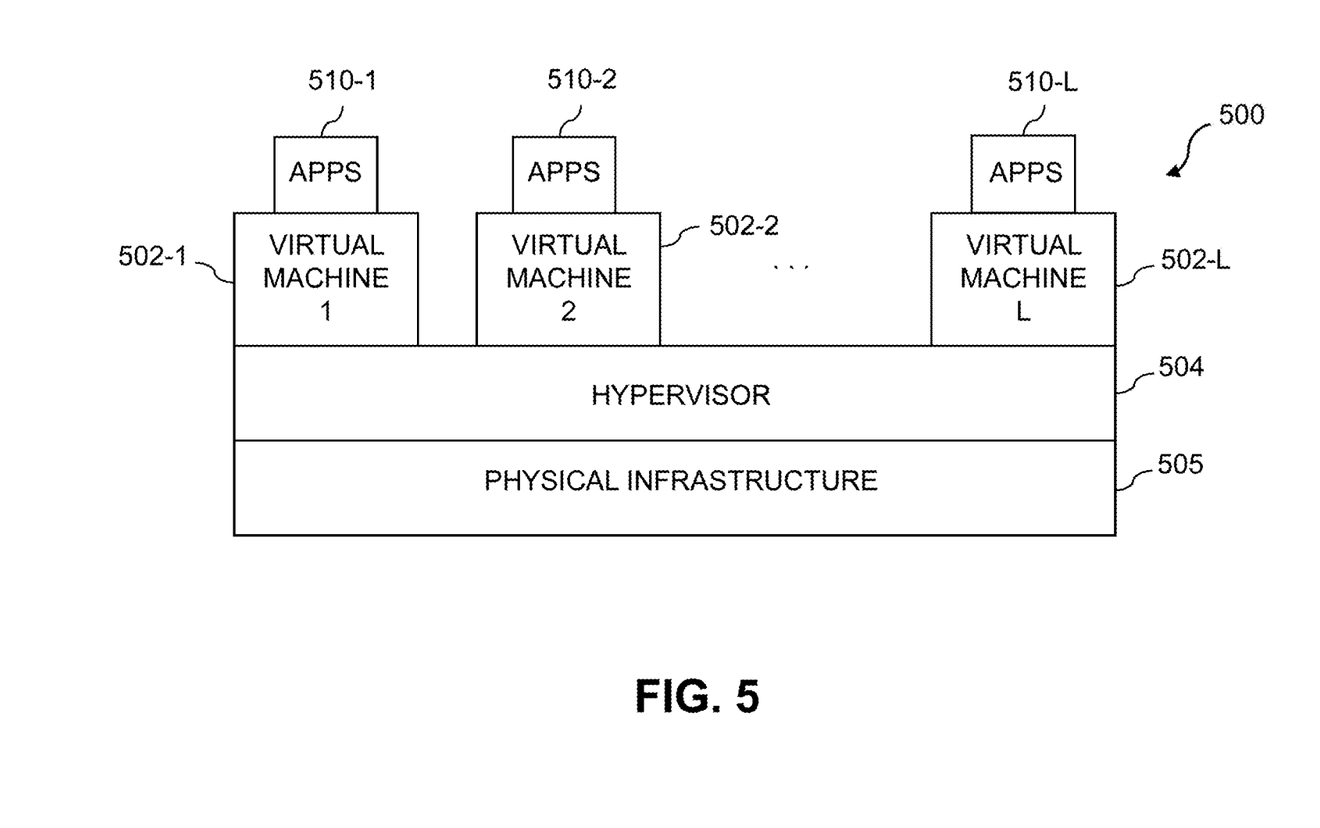
FIGS. 5 and 6 show examples of processing platforms that may be utilized to implement at least a portion of an information processing system in illustrative embodiments.
Figure 6:
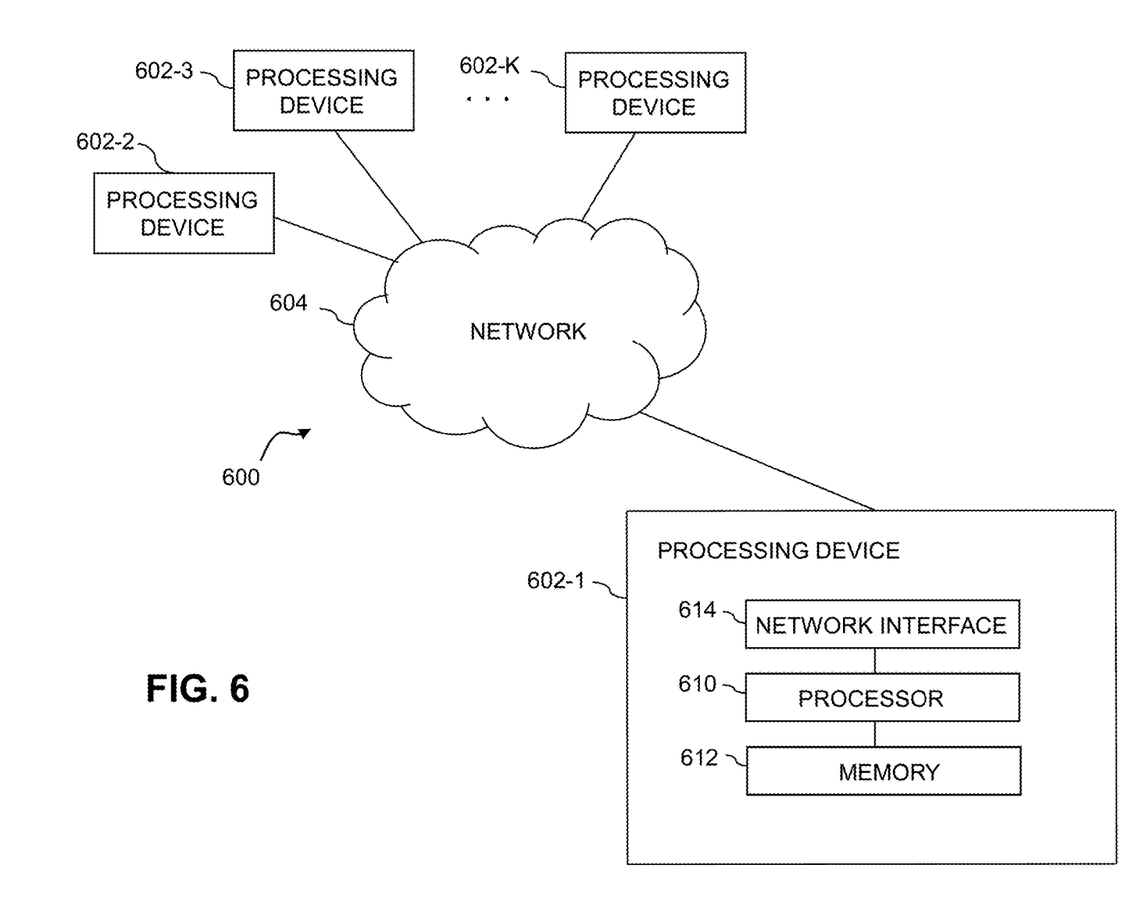

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises virtual machines (VMs) 502-1, 502-2, . . . 502-L implemented using a hypervisor 504. The hypervisor 504 runs on physical infrastructure 505. The cloud infrastructure 500 further comprises sets of applications 510-1, 510-2, . . . 510-L running on respective ones of the virtual machines 502-1, 502-2, . . . 502-L under the control of the hypervisor 504.

Although only a single hypervisor 504 is shown in the embodiment of FIG. 5, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 504 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the storage controllers 110 and 130 of the respective source and target site data centers 102 and 122 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, source and target sites, storage systems, storage devices and storage controllers. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising a plurality of storage devices;
the storage system being associated with a target site;
the storage system being configured to participate in a cycle-based asynchronous replication process with a storage system of a source site;
the storage system of the target site being further configured:
to receive from the storage system of the source site, in respective ones of a plurality of cycles of the cycle-based asynchronous replication process, corresponding sets of differential data representing respective deltas between pairs of source site snapshots for respective pairs of the cycles;
to utilize the sets of differential data received in the respective ones of the cycles to update respective target site snapshots for those cycles; and
over multiple ones of the cycles, to generate target site signatures for respective different portions of a designated one of the updated target site snapshots, to receive from the storage system of the source site corresponding source site signatures for respective different portions of a designated one of the source site snapshots, and to compare the target site and source site signatures in order to verify that the designated target site and source site snapshots are equivalent;
the verification of equivalence of the designated target site and source site snapshots thereby being spread over the multiple cycles with pairs of target site and source site signatures for the different portions of those snapshots being compared in respective ones of the multiple cycles;
wherein the different portions of the designated target site and source site snapshots have respective sizes determined as a function of a number of cycles of the cycle-based asynchronous replication process available for completion of the verification of equivalence of the designated target site and source site snapshots.

2. The apparatus of claim 1 wherein the target site and source site signatures comprise at least one of a checksum and a hash of corresponding portions of the designated target site and source site snapshots.

3. The apparatus of claim 1 wherein the different portions of the designated target site and source site snapshots for which the verification of equivalence is spread over the multiple cycles comprise respective percentages of the designated target site and source site snapshots.

4. The apparatus of claim 3 wherein different percentages of the designated target site and source site snapshots are utilized in different ones of the multiple cycles.

5. The apparatus of claim 3 wherein a fixed percentage of the designated target site and source site snapshots is utilized in each of the multiple cycles.

6. The apparatus of claim 5 wherein the target site and source site signatures for different n percent portions of the designated target site and source site snapshots are verified in each of 100/n of the cycles.

7. The apparatus of claim 1 wherein the different portions of the designated target site and source site snapshots for which the verification of equivalence is spread over the multiple cycles are determined at least in part based on a number n of the cycles of the cycle-based asynchronous replication process that are expected to be executed within a given time period.

8. The apparatus of claim 7 wherein the different portions of the designated target site and source site snapshots for which the verification of equivalence is spread over the multiple cycles are determined by first determining n for the given time period and then computing 100/n to determine a percentage of the designated target site and source site snapshots to be verified in each of the n cycles.

9. The apparatus of claim 1 wherein the different portions of the designated target site and source site snapshots for which the verification of equivalence is spread over the multiple cycles are dynamically adapted over time in order to control a lag time between initiation of transfer of a given one of the sets of differential data by the storage system of the source site and update of the corresponding target site snapshot by the storage system of the target site.

10. The apparatus of claim 1 wherein the different portions of the designated target site and source site snapshots for which the verification of equivalence is spread over the multiple cycles are dynamically adapted over time by:
for a current one of the multiple cycles, calculating a verification rate as a function of a time elapsed for verification of a given one of the portions in a previous one of the multiple cycles;
calculating an amount of time remaining in a recover point objective period for the current cycle; and
multiplying the verification rate by the amount of time remaining in the recover point objective period for the current cycle to determine a particular portion of the designated target site and source site snapshots to be verified in the current cycle.

11. The apparatus of claim 10 wherein if the particular portion determined by multiplying the verification rate by the amount of time remaining in the recover point objective period for the current cycle is less than a specified minimum portion, the minimum portion is verified in the current cycle.

12. The apparatus of claim 1 wherein the storage systems of the target and source sites comprise respective content addressable storage systems having respective sets of non-volatile memory storage devices.

13. The apparatus of claim 1 wherein the storage systems of the target and source sites comprise respective clustered storage systems having respective sets of storage nodes each having a plurality of storage devices.

14. The apparatus of claim 1 wherein target site comprises a disaster recovery site data center and the source site comprises a production site data center.

15. A method comprising:
configuring a storage system of a target site to participate in a cycle-based asynchronous replication process with a storage system of a source site; and
in conjunction with performance of the cycle-based asynchronous replication process, the storage system of the target site:
receiving from the storage system of the source site, in respective ones of a plurality of cycles of the cycle-based asynchronous replication process, corresponding sets of differential data representing respective deltas between pairs of source site snapshots for respective pairs of the cycles;

utilizing the sets of differential data received in the respective ones of the cycles to update respective target site snapshots for those cycles; and over multiple ones of the cycles, generating target site signatures for respective different portions of a designated one of the updated target site snapshots, receiving from the storage system of the source site corresponding source site signatures for respective different portions of a designated one of the source site snapshots, and comparing the target site and source site signatures in order to verify that the designated target site and source site snapshots are equivalent;

the verification of equivalence of the designated target site and source site snapshots thereby being spread over the multiple cycles with pairs of target site and source site signatures for the different portions of those snapshots being compared in respective ones of the multiple cycles;

wherein the different portions of the designated target site and source site snapshots have respective sizes determined as a function of a number of cycles of the cycle-based asynchronous replication process available for completion of the verification of equivalence of the designated target site and source site snapshots; and wherein the method is implemented by at least one processing device comprising a processor coupled to a memory.

16. The method of claim 15 wherein the different portions of the designated target site and source site snapshots for which the verification of equivalence is spread over the multiple cycles comprise respective percentages of the designated target site and source site snapshots.

17. The method of claim 15 wherein the different portions of the designated target site and source site snapshots for which the verification of equivalence is spread over the multiple cycles are dynamically adapted over time in order to control a lag time between initiation of transfer of a given one of the sets of differential data by the storage system of the source site and update of the corresponding target site snapshot by the storage system of the target site.

18. A computer program product comprising a non-transitory processor-readable storage medium having stored therein program code of one or more software programs, wherein the program code when executed by at least one processing device of a storage system of a target site causes said storage system of the target site:

to participate in a cycle-based asynchronous replication process with a storage system of a source site; and in conjunction with performance of the cycle-based asynchronous replication process:

to receive from the storage system of the source site, in respective ones of a plurality of cycles of the cycle-based asynchronous replication process, corresponding sets of differential data representing respective deltas between pairs of source site snapshots for respective pairs of the cycles;

to utilize the sets of differential data received in the respective ones of the cycles to update respective target site snapshots for those cycles; and over multiple ones of the cycles, to generate target site signatures for respective different portions of a designated one of the updated target site snapshots, to receive from the storage system of the source site corresponding source site signatures for respective different portions of a designated one of the source site snapshots, and to compare the target site and source site signatures in order to verify that the designated target site and source site snapshots are equivalent;

the verification of equivalence of the designated target site and source site snapshots thereby being spread over the multiple cycles with pairs of target site and source site signatures for the different portions of those snapshots being compared in respective ones of the multiple cycles;

wherein the different portions of the designated target site and source site snapshots have respective sizes determined as a function of a number of cycles of the cycle-based asynchronous replication process available for completion of the verification of equivalence of the designated target site and source site snapshots.

19. The computer program product of claim 18 wherein the different portions of the designated target site and source site snapshots for which the verification of equivalence is spread over the multiple cycles comprise respective percentages of the designated target site and source site snapshots.

20. The computer program product of claim 18 wherein the different portions of the designated target site and source site snapshots for which the verification of equivalence is spread over the multiple cycles are dynamically adapted over time in order to control a lag time between initiation of transfer of a given one of the sets of differential data by the storage system of the source site and update of the corresponding target site snapshot by the storage system of the target site.

* * * * *